May 23, 1939.  F. B. ANDERSON  2,159,775
GALVANOMETER
Filed July 6, 1936

INVENTOR
F. B. ANDERSON
BY
ATTORNEY

Patented May 23, 1939

2,159,775

UNITED STATES PATENT OFFICE 2,159,775

GALVANOMETER

Frithiof B. Anderson, Bloomfield, N. J., assignor to Bell Telephone Laboratories, Incorporated, New York, N. Y., a corporation of New York Application July 6, 1936, Serial No. 89,035

6 Claims. (Cl. 171—95)

This invention relates to electrical measuring instruments and particularly to those of the moving coil type which are required to be extremely sensitive.

Electrical measuring instruments now available are generally constructed to have a limited range of action. An instrument designed for very weak currents may be used to measure strong currents provided a current reducing network is connected between it and the current source. However, the mechanical delicacy and generally long period of swing are bothersome, although not impossible of toleration, when the measurement of a strong current could be accomplished with greater facility with a less sensitive and less delicate instrument. An instrument intended primarily for the measurement of strong currents lacks the sensitivity required for the measurement of weak currents. To cover a wide range of current strengths, therefore, it has hitherto been necessary to employ two or more instruments, each designed to cover a portion of the desired range. Such a multiplicity of instruments is costly and offers at best a compromise between conditions at extremes of the working range of each instrument.

It is the object of this invention to provide a single instrument which is capable of covering an extremely wide range of current strengths.

A feature of this invention is a means for adjusting the sensitivity of an instrument to the range required for a given measurement.

Another feature is a means for shortening the period of a high sensitivity instrument when it is used at a fraction of its full sensitivity.

In its preferred form, this invention comprises a direct current galvanometer of the moving coil type wherein the coil is suspended in a magnetic field. For sensitivity control, an alternating field is superimposed upon the steady magnetic field and means are provided for causing the coil circuit to have either a capacitive or inductive reactance with respect to the alternating current induced therein by the action of the coil in the alternating field. With a capacitive reactance the steady torque due to the reaction of the induced alternating current with the alternating field flux will tend to assist the coil in moving under the influence of the measured current, and with an inductive reactance the torque will tend to retard the movement of the coil. The magnitude of the torque can be controlled by controlling the strength of the alternating field.

In the drawing which accompanies this specification and forms a part thereof:

Figure 1:
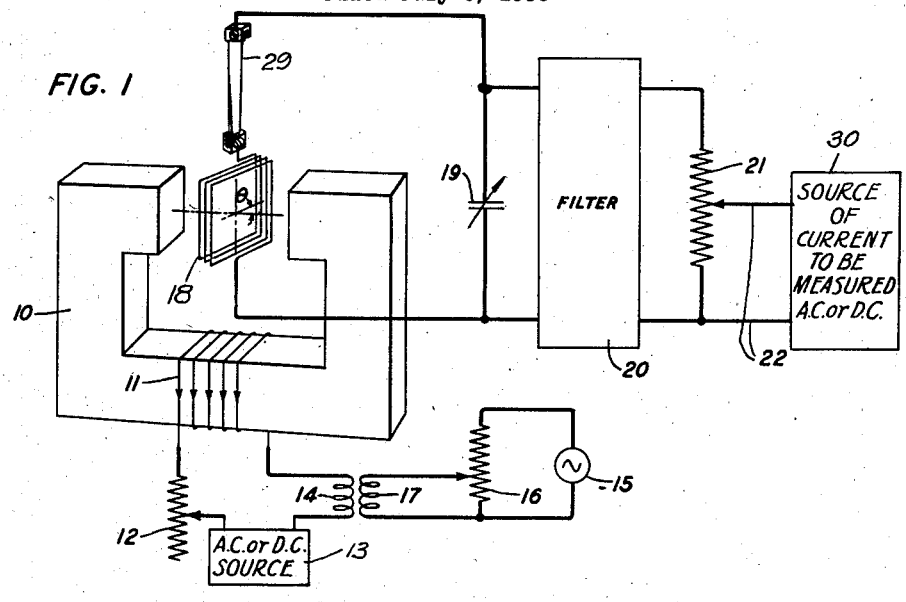
Fig. 1 is a schematic wiring diagram of the circuit used in my improved galvanometer.

Before entering into a detailed description of the drawing, some of the theoretical considerations upon which this invention is based will be given.

The fundamental condition of motion for the coil of the galvanometer at any instant may be expressed as $$L = I\alpha + K\theta \qquad (1)$$

wherein
L = torque acting on the coil
I = moment of inertia of the coil
$\alpha$ = angular acceleration
K = torque of the suspension per radian deflection
$\theta$ = angular deflection in radians referred to the position of no suspension torque.

The coil, for simplicity, is assumed to be rectangular, and symmetrically disposed about the axis of rotation, which is normal to the field flux, assumed uniform. The torque acting upon the coil as a result of the current passing therethrough is given by the expression $$L = \beta i l d n \cos \theta_1$$

wherein
$\beta$ = flux density
$i$ = current through coil
$l$ = length of coil assumed normal to flux (or parallel to axis of rotation)
$d$ = width of coil
$n$ = number of turns of wire
$\theta_1$ = angular deflection of coil with respect to magnetic field which may be simplified to $$L = \gamma_m i \cos \theta_1 \qquad (2)$$

wherein $\gamma_m$ = maximum flux linkage of the coil when $\theta_1 = 90°$.

The current may be expressed as:

$$i = \frac{e - \frac{d\lambda}{dt}}{R} \quad (3)$$

wherein
- $e$ = applied E. M. F.
- $\gamma$ = instantaneous flux linkage of coil
- $\frac{d\lambda}{dt}$ = back E. M. F. due to motion of coil in magnetic field
- $R$ = resistance of coil and driving circuit (the effects of inductance and capacity being assumed negligible for simplicity of presentation), and it can be shown that $$\frac{d\lambda}{dt} = \lambda_m \cos\theta_1 \frac{d\theta}{dt} \quad (4)$$

Substituting Equations 2, 3 and 4 in 1 and re-arranging terms, $$e\frac{\lambda_m}{R}\cos\theta_1 = I\frac{d^2\theta}{dt^2} + \frac{\lambda_m^2}{R}\cos\theta_1\frac{d\theta}{dt} + K\theta \quad (5)$$

Figure 2:
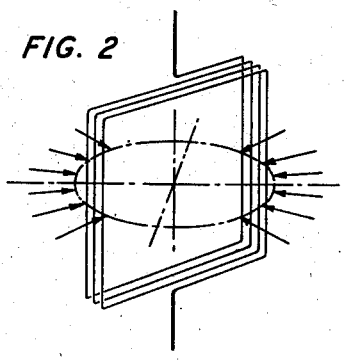
Figs. 2 and 3 show the direction of flux with respect to the coil under certain conditions.
Figure 3:
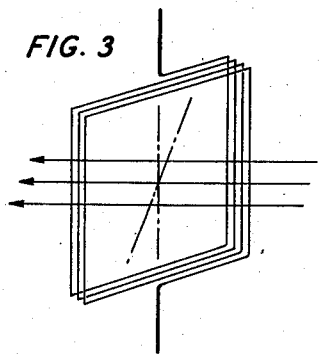

This equation is predicated upon the existence of a uniform field normal to the axis of the coil as shown in Fig. 3. If the field is radial as in Fig. 2, $\theta_1$ vanishes and $\cos\theta_1$ becomes unity. When $\theta$ is small, however, a radial field can be approximated very closely by a uniform field in a plane normal to the axis of the coil as shown in Fig. 3, and Equation 5 may be written $$\frac{e\lambda_m}{R} = I\frac{d^2\theta}{dt^2} + \frac{\lambda_m^2}{R}\frac{d\theta}{dt} + K\theta \quad (6)$$

This equation represents motion of the coil in response to an electromotive force $e$ applied. As time $t$ increases, the final deflection is reached and $$\frac{e\lambda_m}{R} = \lambda_m i = K\theta \quad (6A)$$

represents the condition of final deflection. If $K\theta$ is modified by an opposing torque proportional to $\theta$, say $-K_1\theta$, Equation 6 becomes $$\frac{e\lambda_m}{R} = I\frac{d^2\theta}{dt^2} + \frac{\lambda_m^2}{R}\frac{d\theta}{dt} + (K+K_1)\theta \quad (7)$$

Thus by modifying the factor $K_1\theta$ the torque may be made to aid or oppose the spring suspension as desired. Equation 7 holds for a radial field; Equation 5 for a uniform field.

In accordance with the invention the modifying torque is developed by the action of an alternating magnetic field superimposed upon the normal magnetizing flux of the galvanometer. As shown in Fig. 1, 10 is the field magnet of the galvanometer and it is energized by a coil 11 which is connected to a variable resistance 12, a source of magnetizing current 13 and an inductance 14, which may form one winding of a transformer, all in series. A source of alternating current 15, the magnitude of which is controllable by potentiometer 16 is coupled to inductance 14 through a second inductance 17 forming the other winding of the transformer. Thus in the case of a direct current galvanometer, the field coil 11 has both alternating and direct current flowing through it, the magnitude of each type of current being controllable by the operator, and each current produces its own distinctive field.

The moving coil 18 of the galvanometer is shown suspended by a torsionally resilient spring 29 between the poles of field magnet 10 and connected to an input circuit comprising, for example, a shunt condenser 19, a filter 20 and the well-known Ayrton shunt 21, with leads 22 for connection to the source 30 of current to be measured. Since moving coil 18 is subject to the action of the superimposed alternating field, an electromotive force is developed which causes current to circulate through the coil and the external circuit connected to the coil. By governing the phase of the circulating current, i. e., by adjusting the impedance characteristics of the coil and its external circuit, the nature of the torque produced by the interaction of the circulating current and the alternating exciting field can be controlled. This can be demonstrated as follows:

Let
$$\varphi_F = \varphi_0 + \varphi_1 \sin\omega t$$

wherein
- $\varphi_F$ = field flux, assumed uniform
- $\varphi_0$ = steady component
- $\varphi_1 \sin\omega t$ = alternating component
- $\varphi_1 = \theta$ = angular deflection of coil. (The position of no suspension torque is assumed identical with that of no flux linkage for simplicity)
- $K\theta$ = restoring torque due to suspension
- $i = i_0 + i_1$ = current through coil due to external applied steady E. M. F. + current circulating through coil due to E. M. F. induced by alternating field flux $\varphi_1 \sin\omega t$, respectively.

The torques acting on the coil when at rest, deflected or not, may be expressed by $$\Sigma L = 0$$

or $$K\theta = \lambda_m i \cos\theta$$

where
- $\lambda_m$ = the total number of flux linkages of the moving coil when $\theta = \frac{\pi}{2}$, field uniform $$K\theta = (\lambda_0 + \lambda_1 \sin\omega t)\cos\theta\left[i_0 - \frac{\sin\theta}{Z}\frac{d}{dt}(\lambda_0 + \lambda_1 \sin\omega t)\right] \quad (45)$$

where
- $\lambda_0$ = the steady component of $\lambda_m$
- $\lambda_1$ = the alternating component of $\lambda_m$
- $Z$ = the impedance presented to the E. M. F. induced in the moving coil
  $= R + jX$ $$K\theta = i_0 \cos\theta(\lambda_0 + \lambda_1 \sin\omega t) - (\lambda_0 + \lambda_1 \sin\omega t) \times$$
$$\frac{\cos\theta \sin\theta \lambda_1 \omega \cos}{\sqrt{R^2 + X^2}}\left(\omega t - \tan^{-1}\frac{X}{R}\right)$$

$$= i_0\lambda_0 \cos\theta + i_0\lambda_1 \cos\theta \sin\omega t$$
$$- \frac{\lambda_0\lambda_1\omega \sin 2\theta}{2\sqrt{R^2 + X^2}}\cos\left(\omega t - \tan^{-1}\frac{X}{R}\right)$$
$$- \frac{\lambda_1^2\omega \sin 2\theta}{2\sqrt{R^2 + X^2}}\sin\omega t \cos\left(\omega t - \tan^{-1}\frac{X}{R}\right) \quad (8)$$

The first term of Equation 8, $i_0 \lambda_0 \cos\theta$, represents the normal torque due to a steady current $i_0$ reacting with the steady flux $\varphi_0$.

The second and third terms represent an oscillating torque which will not affect the coil deflection appreciably provided that the natural period of the coil and suspension system is much longer than that of the applied alternating flux.

The last term presents an additional pair of torques, one oscillating and one steady.

Let $\theta$ be assumed small, then $$-\frac{\lambda_1^2\omega \sin 2\theta}{2\sqrt{R^2+X^2}} \sin \omega t \cos\left(\omega t-\tan^{-1}\frac{X}{R}\right)$$

$$=-\frac{\lambda_1^2\omega\theta}{\sqrt{R^2+X^2}}\frac{1}{2}\left[\sin\left(2\omega t-\tan^{-1}\frac{X}{R}\right)+\sin\left(\tan^{-1}\frac{X}{R}\right)\right]$$

$$=-\frac{\lambda_1^2\omega\theta}{2\sqrt{R^2+X^2}}\sin\left(2\omega t-\tan^{-1}\frac{X}{R}\right)$$

$$-\frac{\lambda_1^2\omega\theta}{2\sqrt{R^2+X^2}}\frac{X}{\sqrt{R^2+X^2}}$$

The first term represents the double frequency oscillating torque, the second a steady torque proportional to the deflection $\theta$, the sign of which is governed by the nature of the reactive impedance X and the magnitude of which is governed by the quantities $\lambda_1$, $\omega$, R and X, all of which are constants, and the variable $\theta$.

Collecting all terms representing steady torques—

$$(K\theta) \text{ steady}=i_0\lambda_0 \cos\theta-\frac{\lambda_1^2\omega\theta X}{2(R^2+X^2)}$$

$$\theta=\frac{i_0\lambda_0 \cos\theta}{K+\frac{\lambda_1^2\omega X}{2(R^2+X^2)}}$$

If X is negative, the maximum sensitivity, or deflection, will be obtained when $$K=-\frac{\lambda_1^2\omega X}{2(R^2+X^2)}$$

This indicates that when the impedance of the galvanometer coil circuit is capacitive, the sensitivity to direct current will be increased; when it is inductive, the sensitivity will be decreased.

In applying this system to a critically damped D'Arsonval galvanometer, the normal steady field must be reduced to prevent overdamping if the resistance of the system is kept constant. The following presentation neglects the effects of alternating current transients due to the motion of the coil and direct current transients due to reactances in the circuit. However, these effects are small and may be neglected if the natural frequency of the coil is small compared with the auxiliary alternating frequency. This condition is easily realized, and the equations give an indication of the results which may be expected with respect to sensitivity and time of deflection. The undamped period is a criterion of the time of deflection in operation.

Let
- $S_0$=normal galvanometer sensitivity
- $S_\alpha$=amplified galvanometer sensitivity
- $T_0$=normal galvanometer period (undamped)
- $T_\alpha$=amplified galvanometer period (undamped)
- R=critical damping resistance of galvanometer
- I=moment of inertia of galvanometer moving coil
- K=torsion constant of galvanometer moving coil suspension
- $K_1$=torsion constant due to induced E. M. F.

$$=-\frac{\lambda_1^2\omega X}{2(R^2+X^2)}$$

$\lambda_0$=number of steady field flux linkages of moving coil when $$\theta=\frac{\pi}{2}$$

and the system is critically damped
$\lambda_\alpha$=number of moving coil steady field flux linkages when alternating field is applied, $$\theta=\frac{\pi}{2}$$

and damping is critical then $$S_0=\frac{\lambda_0 \cos\theta}{K}=\frac{\lambda_0}{K} \text{ for small } \theta$$

or for radial field $$T_0=2\pi\sqrt{\frac{I}{K}}$$

$$R=\frac{\lambda_0^2}{2\sqrt{IK}}$$

To keep R constant when alternating field is applied—

$$\lambda_\alpha^2=2R\sqrt{I(K+K_1)}$$

$$S_\alpha=\frac{\lambda_\alpha \cos\theta}{K+K_1}=\frac{\sqrt[4]{4R^2I(K+K_1)}}{K+K_1}\cos\theta$$

$$\frac{S_\alpha}{S_0}=\frac{\sqrt[4]{4R^2I(K+K_1)}}{K+K_1}\frac{\cos\theta}{\cos\theta}\cdot\frac{K}{\sqrt[4]{4R^2IK}}$$

$$=\frac{K}{K+K_1}\sqrt[4]{\frac{K+K_1}{K}}$$

$$=\left(\frac{K}{K+K_1}\right)^{\frac{3}{4}}$$

$$\frac{T_\alpha}{T_0}=\frac{2\pi\sqrt{\frac{I}{K+K_1}}}{2\pi\sqrt{\frac{I}{K}}}=\left(\frac{K}{K+K_1}\right)^{\frac{1}{2}}$$

$$\frac{S_\alpha}{S_0}=\left(\frac{T_\alpha}{T_0}\right)^{\frac{3}{2}}$$

or $$T_\alpha\propto(S_\alpha)^{\frac{2}{3}} \text{ and } S_\alpha\propto(T_\alpha)^{\frac{3}{2}}$$

Similar relations may be derived for the condition of constant field flux and the damping resistance varied as K is changed.

This invention can be applied generally to affect the period and damping of a galvanometer as well as its sensitivity. It is customary to design a galvanometer so that it will be sensitive enough for the weakest current within the range of currents it will be expected to measure. To decrease its sensitivity the Ayrton shunt 21 is commonly used. Reducing the shunt resistance 21 reduces the change in damping from full to lesser sensitivities, but this is not desirable since it implies less sensitivity for other constants. As demonstrated above, I and K determine the period $T_0$, and increasing S by changing these factors increases $T_0$, assuming the size of wire in the moving coil is not changed.

A method of operating a galvanometer for minimum period at any sensitivity, with the externally connected circuit resistance constant, and with critical damping for all conditions, is to vary $\lambda_0$ and K. In a direct current galvanometer $\lambda_0$ may be varied by changing the direct current field excitation and K may be varied, as outlined above, by changing the alternating current excitation. The load presented to the moving coil should be inductive for an increased K and capacitive for a decreased K. In both cases the load may be varied by (1) varying the alternating current frequency or (2) varying the alternating current impedance. The degree of variation may be controlled by varying the alternating current excitation voltage. Such operation has the advantage of making the galvanometer speed high for all conditions and does not saddle the long period associated with high sensitivity upon lower sensitivites to the same extent as does the Ayrton shunt method of varying sensitivity.

Although the equations given throughout this specification are applicable to a direct current galvanometer, the general principle is applicable to an alternating current galvanometer as well, and corresponding equations, accordingly, may be derived for such applications. With an alternating current galvanometer, current of the same frequency as that of the measured current will ordinarily be supplied from the source 13 to excite the galvanometer field, and current of a different frequency will be supplied by the source 15 for sensitivity control.

Figure 4:
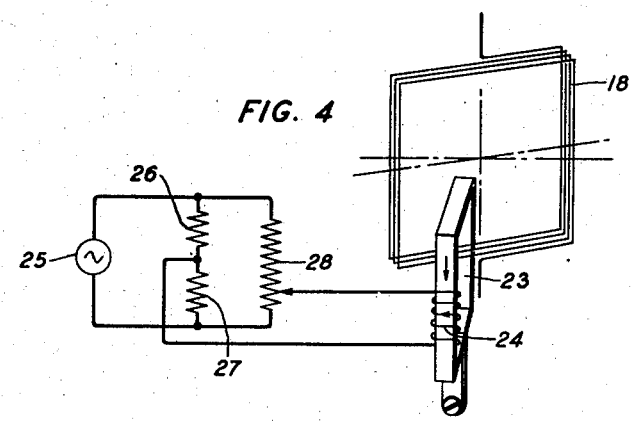
Fig. 4 is a diagram of a zero correction circuit.

In the operation of the galvanometer, the linkage of any alternating flux by the moving coil with no current to be measured flowing through it results in a deflection of the coil from its zero position. The introduction of an ambient alternating flux as in Fig. 4 permits adjustment and control of the moving coil system. In this figure, moving coil 18 oscillates within a magnetic loop 23 the flux in which is induced by a current flowing through coil 24. The current is supplied from a generator 25 through a Wheatstone bridge containing two resistances 26, 27 and a potentiometer 28. The degree of unbalance produced by the potentiometer determines the magnitude of the current flowing through coil 24 and hence the magnitude of the flux tending to restore moving coil 18 to its zero position.

The magnification of deflection possible with a system such as the one herein illustrated is easily of the order of ten or more; multiplications of a hundred have been obtained, and factors of a thousand or more are feasible.

It is understood that the foregoing description is merely illustrative of the invention, and that the invention consequently is not to be limited thereto, but is to be determined by the appended claims.

What is claimed is:

1. A galvanometer comprising a rotatable coil, a mounting therefor which tends to resist the rotation of the coil, an external circuit containing reactance connected to the coil, said circuit carrying an alternating current to be measured, means for producing an electro-magnetic field in the sphere of action of said coil, the field being of the same frequency as the current to be measured, and means for superimposing on the field a second field of different frequency for altering the angle of rotation of the coil per unit of current to be measured.

2. A visual indicator of the dynamometer type comprising a magnetic circuit, an angularly movable armature disposed in said magnetic circuit, spring means for normally maintaining said armature in a predetermined position, a field winding associated with said magnetic circuit, an armature winding carried by said armature, means for impressing oscillatory currents on said field winding, means for impressing signal currents on said armature winding, and means for increasing the sensitivity of said indicator by reducing the effective restoring force of said spring means by introducing a phase angle lead in the armature circuit to produce a field circuit induction torque which almost equals the spring restoring torque on said armature.

3. A visual indicator of the dynamometer type comprising a magnetic circuit, an angularly movable armature disposed in said magnetic circuit, spring means for normally maintaining said armature in a predetermined position, a field winding associated with said magnetic circuit, an armature winding carried by said armature, means for impressing oscillatory currents on said field winding, means for impressing signal currents on said armature winding, and means for effecting maximum damping of said armature and securing optimum meter sensitivity by establishing a phase angle lead in said armature circuit to produce a field circuit induction torque that nearly equals the spring restoring torque.

4. In a galvanometer, means for producing a magnetic field, a coil carrying an electric current to be measured, means for mounting the coil for rotation in the field and means for determining the sensitivity of the coil to rotation comprising a circuit containing reactance connected to the coil and means for subjecting the coil to the action of an alternating magnetic flux.

5. A galvanometer in accordance with claim 4 in combination with means for varying both the magnetic field and the alternating flux to produce critical damping at different sensitivities.

6. In a galvanometer, means for producing a magnetic field, a rotatable coil carrying currents to be measured, a torsionally resilient mounting supporting the coil in the field and opposing its rotation and means for adjusting the sensitivity of the coil to rotation comprising means for superimposing an alternating magnetic flux on said field and an adjustable condenser connected to the coil for varying the phase angle of the current induced in the coil by the alternating flux.

FRITHIOF B. ANDERSON.